United States Patent [19]

Korosue

[11] 4,299,581
[45] Nov. 10, 1981

[54] STEPLESS TRANSMISSION DEVICE FOR A BICYCLE

[75] Inventor: Akira Korosue, Nishinomiya, Japan

[73] Assignee: Nankai Tekko Co., Ltd., Osaka, Japan

[21] Appl. No.: 77,778

[22] Filed: Sep. 21, 1979

[30] Foreign Application Priority Data

Sep. 24, 1978 [JP] Japan ............................. 53-117735

[51] Int. Cl.³ ....................... F16H 11/06; F16H 29/06
[52] U.S. Cl. ...................................... 474/69; 74/117; 474/70
[58] Field of Search ...................... 474/69, 70; 74/117; 280/236, 261

[56] References Cited

U.S. PATENT DOCUMENTS

| Re. 30,078 | 8/1979 | Harris | 474/69 |
| Re. 30,364 | 8/1980 | Harris | 74/117 |
| 4,164,153 | 8/1979 | Moritsch | 474/70 |

FOREIGN PATENT DOCUMENTS 35-4016  6/1960  Japan .

Primary Examiner—Allan D. Herrmann

[57] ABSTRACT

A stepless transmission device for a bicycle which has sufficient durability and smooth operation characteristics for practical use is provided. The transmission device can steplessly change the rotational ratio of a wheel to a drive sprocket by changing the oscillation angle of rachet arms which are radially disposed on the periphery of a disk fixed to a shaft for said sprocket. The transmission device is characterized in that said rachet arms incorporated with respective crank arms are pivoted to said sprocket in positions equally distributed on a coaxial circle, and one end of each crank arm constitutes a guide pin, said guide pin being engaged in an annular groove which is coaxially provided in a rotatable bearing race the eccentricity of which can be changed.

4 Claims, 15 Drawing Figures

STEPLESS TRANSMISSION DEVICE FOR A BICYCLE

BACKGROUND OF THE INVENTION

1. Field of the Invention

This invention relates to a stepless transmission device for a bicycle, particularly to a transmission device wherein a plurality of rachet arms are disposed around a disk fixed to a sprocket, and the relative speed between claws on the tip of the arms and a rachet wheel is changed by changing the oscillating angle of the arms.

2. Description of the Prior Art

It has been desired to obtain an improved stepless transmission device for a bicycle, and various kinds of transmission devices have been proposed.

A transmission device for a bicycle is known wherein a plurality of rachet arms are disposed around a disk fixed to a sprocket, and an inner rachet wheel, which rotates with the same speed as the wheels of the bicycle, is multiplied by changing the oscillating angle of the rachet arm. In other words the rotational ratio of the wheel to the sprocket is steplessly changed by adding positive speed components to the speed of rotation of the rachet arm as is disclosed in Japanese Patent Publication No. 4016/1960. According to this publication, some rachet arms are pivoted on a disk fixed to a shaft of a sprocket, and a roller mounted on each end of the rachet arm is engaged in an annular ring which can be moved in the direction perpendicular to the shaft by external force, so that a claw at the tip of the rachet arm oscillates because of the annular groove as well as rotating when the ring is displaced from its normal position. As the amplitude of the oscillation of the arm is proportional to the displacement of the ring, the rotationary speed of the sprocket is steplessly multiplied and transmitted to the wheel.

The transmission device according to the above invention has a relatively simple constitution and is light in weight. However, the rollers are under a load in travelling, and are particularly heavily loaded in the speed changing operation. Accordingly the roller is scraped against the groove causing low durability and low mechanical efficiency. Further, not many rachet arms can be disposed in the transmission device, so that jerky movement is induced every time the arms transmit force to the inner rachet. The jerky movement is not comfortable and gives undesirable shock to the device.

Because of the above described defects, the transmission device of the above publication has not been put to practical use irrespective of being disclosed about twenty years ago.

A lot of other inventions concerning a stepless transmission device for a bicycle have also not come to practical success. This fact proves that it is very difficult to develop an improved transmission device for a bicycle even if it seems to be easy. The reasons for this difficulty are that the transmission device must be of light weight and of simple construction since the device is for a bicycle, and the device must have sufficient durability for practical use.

SUMMARY OF THE INVENTION

It is an object of the invention to provide an improved stepless transmission device for a bicycle which has sufficient durability and smooth operation characteristics for practical use.

The present invention resides in a transmission device for a bicycle which can steplessly change the rotational ratio of a wheel to a drive sprocket by changing the oscillation angle of rachet arms which are radially disposed on the periphery of a disk fixed to a shaft for said sprocket, characterized in that said rachet arms incorporated with respective crank arms are pivoted to said sprocket in positions equally distributed on a coaxial circle, and one end of said crank arm constitutes a guide pin, said guide pin being engaged in an annular groove which is coaxially provided in a rotatable bearing race the eccentricity of which can be changed.

According to this invention the bearing race rotates at approximately the same speed as the sprocket even when it is eccentric. Therefore it is not likely to induce excessive friction between the inner surface of the groove and the guide pin (or a bushing put on the guide pin), and the width of the device can be reduced since the sprocket itself is used as a bearing for the oscillating movement of the arm. Further, what is important is that it is possible to dispose more than eight rachet arms. This is an essential feature of the present invention to ensure smoothness in force transmission during the speed change operation. According to our experiments even a transmission device with six rachet arms works very smoothly without jerky movement. Therefore smoother operation will be expected if more than eight arms are used. In our moving test over 1000 km, the transmission device revealed sufficient durability. Further the present invention can be easily applied to an automatic transmission apparatus which accomplishes automatic speed change in accordance with the road or travelling conditions. Therefore comfortable travelling without the need of gear shifting is attained.

BRIEF DESCRIPTION OF THE DRAWINGS

The above brief description, as well as further objects, features and advantages of the present invention, will be more fully understood by reference to the following detailed description of the presently preferred, but nonetheless illustrative, embodiment in accordance with the present invention when taken in conjunction with the accompanying drawings, wherein.

DESCRIPTION OF THE PREFERRED EMBODIMENT

Figure 1:
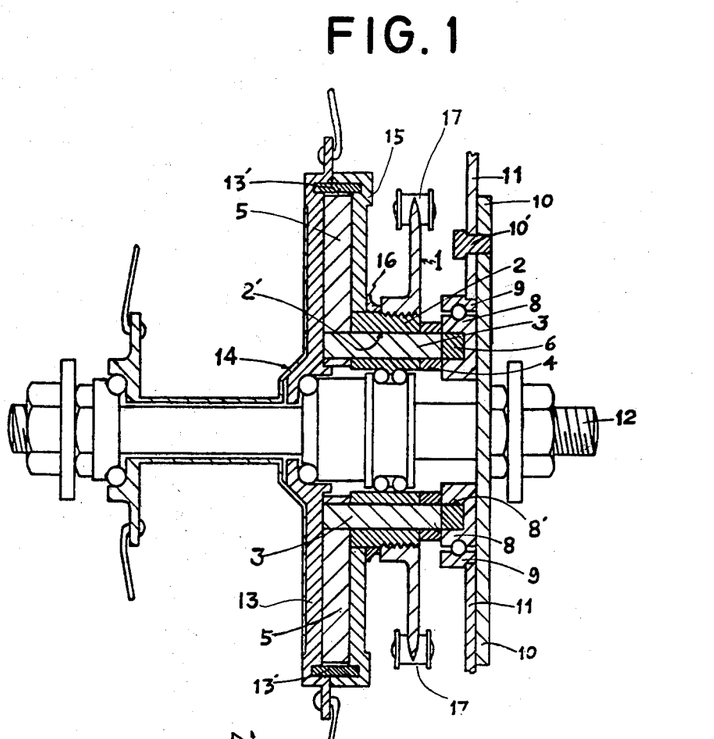
FIG. 1 is an elevational sectional view of the main portion of the transmission device of the present invention.
Figure 2:
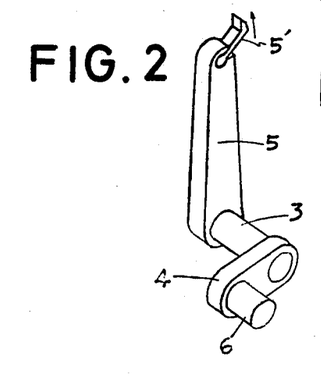
FIG. 2 is a perspective view of a crank unit.
Figure 3:
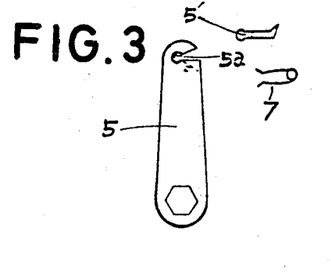
FIG. 3 is a plan view showing the mounting structure for mounting a claw to a rachet arm.

Referring now to FIG. 1, an elevational sectional view of a typical embodiment of the present invention is shown. A driving force from pedals (not shown) is transmitted to a sprocket 1 and a boss 2 fixed to the sprocket through a chain 17. The boss 2 has eight holes 2' disposed at positions equally distributed on a coaxial circle. Into each hole 2' is slidably inserted crank shaft 3. As shown in FIG. 2, on one end of each shaft 3 is mounted a rachet arm 5 extending at 90° to shaft 3 and having a movable claw 5' at the tip thereof, and on the other end of each shaft 3 is mounted a crank arm 4 also extending at 90° to shaft 3 and having a guide pin 6 at the tip thereof with the rachet arm 5 and the crank arm 4 located in spaced parallel planes with respect to each other, each extending in its plane in a direction 90° from the direction of the other. The rachet arm 5 has a hole 5a with a beveling at the tip as shown in FIG. 3, into which the claw 5' having a form corresponding to the hole 5a is movably fitted, and the claw 5' is biased in the direction of the arrow by a spring 7. The guide pin 6 is fitted in an annular groove 8' concentrically provided on an inner race 8. The inner race 8 is rotatably fitted in an outer race 9 through balls. The outer race 9 is fixed to a cam plate 11 and is capable of oscillating about a pin 10' fixed to an end-plate 10 which in turn is fixed to the bicycle body. Accordingly, when the cam plate 11 is oscillated, the inner race 8 is capable of being eccentric in a predetermined range with respect to the center of a hub shaft 12 through the outer race 9.

An inner rachet wheel 13 is coaxially fixed to a hub flange 14. Claws 13' of the wheel 13 always engage the claws 5' of the rachet arms 5 in one direction. The inner rachet wheel 13 and the rachet arms 5 are covered by a cover 15 from the side of the sprocket 1, and the gap between the boss 2 and the cover 15 is sealed by an oil seal 16 so as to prevent the leakage of lubricating oil and the penetration of dust and water.

Figure 7A:
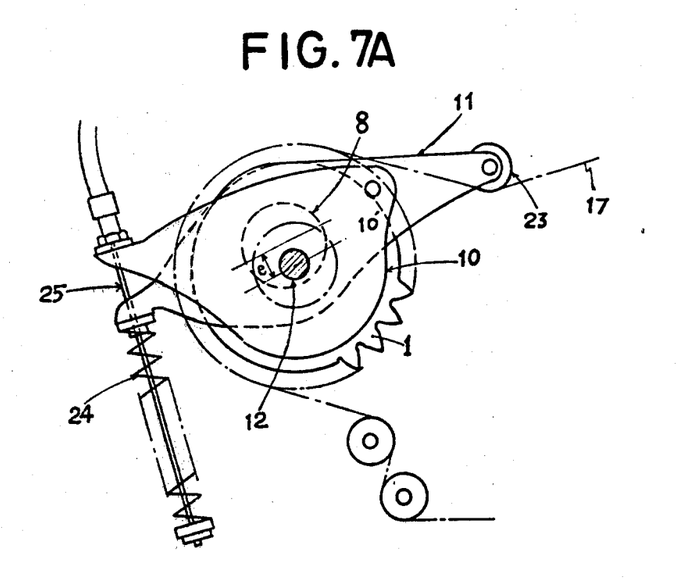
FIGS. 7A and 7B are plan views of the transmission device showing its speed changing operation.
Figure 7B:
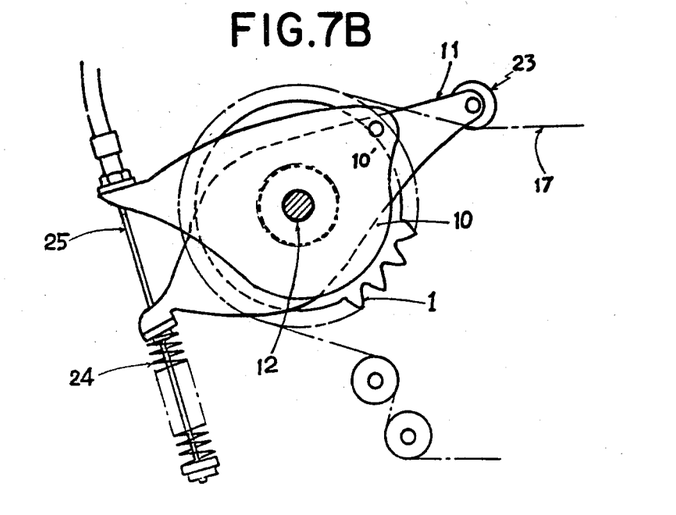
Figure 8:
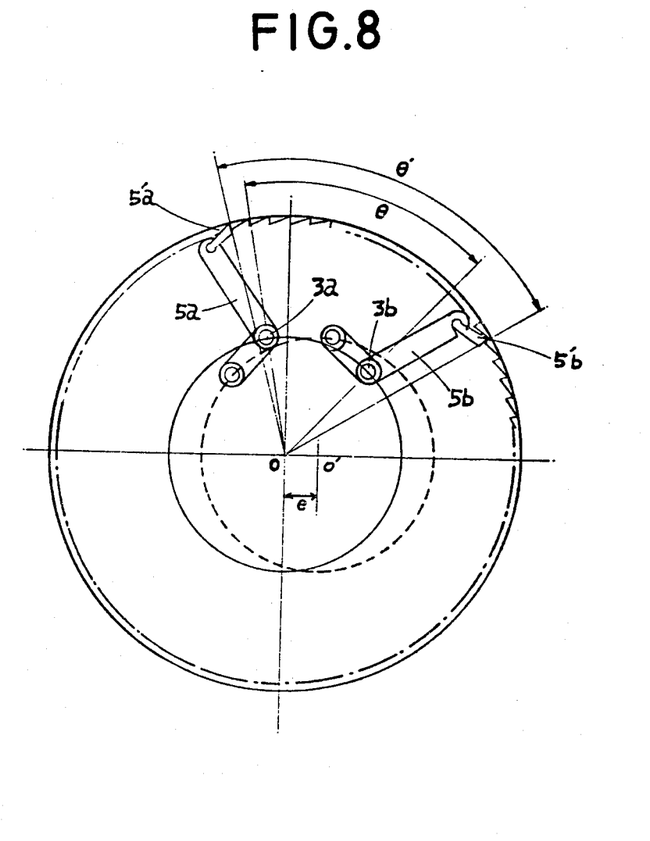
FIG. 8 is a schematic drawing showing the operation of the transmission device.
Figure 9:
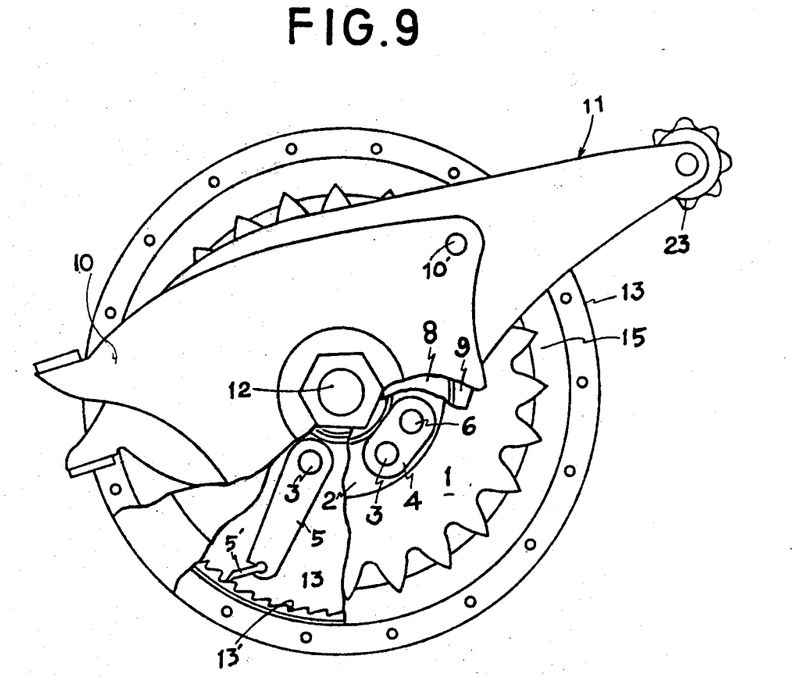
FIG. 9 is a side view of FIG. 1 from the right hand side.
Figure 10:
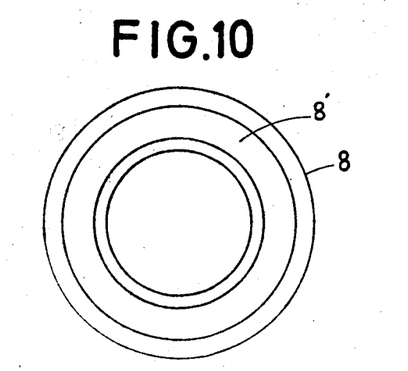
FIG. 10 is a plan view of an inner race.

When the eccentricity of the inner race 8 is null, the crank shaft 3 only rotates around the hub shaft 12 along the groove 8' and no oscillating movement is caused so that all the claws 5' engage the claws 13' of the wheel 13. Thus the rotational speed of the sprocket 1 is the same as that of the rachet wheel 13 (FIG. 7B). On the other hand, when the inner race 8 is given an eccentricity e (FIG. 7A), the guide pins 6 move along the groove 8', so that the shaft 3 oscillates between a certain angle as well as rotates. At this time the claws 5' engage claws 13' only in the direction which multiplies the speed of the wheel 13, so that the wheel 13 rotates faster than the sprocket 1. As a lot of arms 5 are provided on the boss 2 in the radial direction, the arm which has the fastest oscillating speed among them engages the claws 13' to drive them. To be exact, the engagement between the claws 5' and the claws 13' is intermittent, so that the rotational speed of the wheel 13 is changed in the manner that sine waves overlap each other with certain phase differences. However, actually it feels as if the speed of the wheel 13 is multiplied very smoothly. For this purpose the number of rachet arms 5 is at least six, preferably more than eight. FIG. 8, diagrammatically shows the principle of the above mentioned operation. In the operation at null excentricity, the angle $\theta$, between which the shaft 3 moves from a point 3a to a point 3b, is always equal to the angle $\theta'$, between which the claw 5' moves from a point 5a to a point 5b. On the other hand, when the center of the inner race 8 moves from a point O to a point $\theta'$, the angle $\theta'$ becomes greater than the angle Q in accordance with the distance (the eccentricity e) of the movement of the inner race 8. In other words the angular velocity of the claws 5' is the sum of the velocity components of the shaft 3 and arms 5. Thus the multiplying operation is attained.

Figure 4:
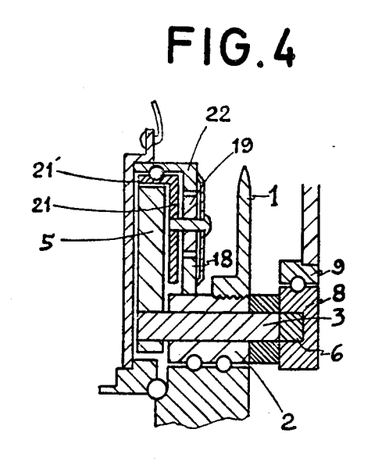
FIGS. 4 and 5 are respectively elevational sectional views of the main portion of the transmission device wherein a planetary gear mechanism is added to the device shown in FIG. 1.
Figure 5:
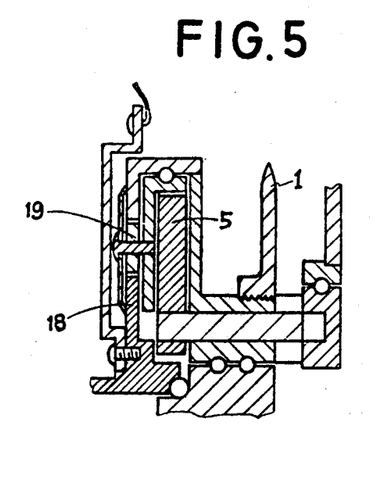

The maximum multiplying ratio of the above mentioned device is approximately 1:1.5, but a ratio of 1:2 can be attained by adding a planetary gear mechanism to the device. FIGS. 4 and 5 show these embodiments. In FIG. 4 the rotation of the sprocket 1 is transmitted to planetary gears 19 through a sun gear 18 fixed to the boss 2, and then transmitted to a carrier 21. As the carrier 21 has inner claws 21' on the inner surface thereof, the multiplying movement caused by rachet arms 5 is transmitted to a wheel of the bicycle through an internal gear 22. The same operation is also accomplished in the embodiment shown in FIG. 5 wherein the sun gear 18 is disposed at the side of the wheel.

Figure 6:
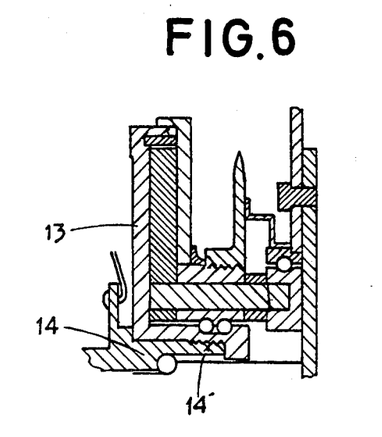
FIG. 6 is an elevational sectional view of a transformed embodiment of the device shown in FIG. 1.

The embodiment shown in FIG. 1 employs a special hub, but the present invention can be applied to a usual hub. FIG. 6 shows such an embodiment. The device is mounted on the right side of the rear wheel by means of thread cut on the surface of the hub flange 14. A recess is provided in the center portion of the rachet wheel 13, and an internal thread 14' is cut on the inner surface of the recess to be screwed to the hub flange 14. The mechanism of the transmission device itself is the same as that of the embodiment shown in FIG. 1.

The transmission device of the present invention is normally used in the form of an automatic transmission apparatus. FIG. 7 diagramatically shows the constitution of the apparatus. An idler sprocket 23 is rotatably mounted on one end of cam plate 11 which is pivoted about pin 10', and the cam plate 11 is normally held in the position shown in FIG. 7A by the force of a spring 24 disposed on the other end of the plate 11. Accordingly, the multiplying operation is carried out as above described when the sprocket is rotated. On the contrary, at the start or in travelling on an upward slope or a bad road, stronger force is applied to the pedals, and this causes the chain 17 to be tensioned intensely holding up the idler sprocket 23. Thus the cam plate 11 comes to the position shown in FIG. 7B and the eccentricity becomes null, so that the speed ratio between the sprocket and wheel becomes 1:1 or so. Further, as a wire 25 is connected to a manual lever disposed on the handle or bicycle body, the eccentricity can be freely controlled by manupulating the lever at will.

Figure 11A:
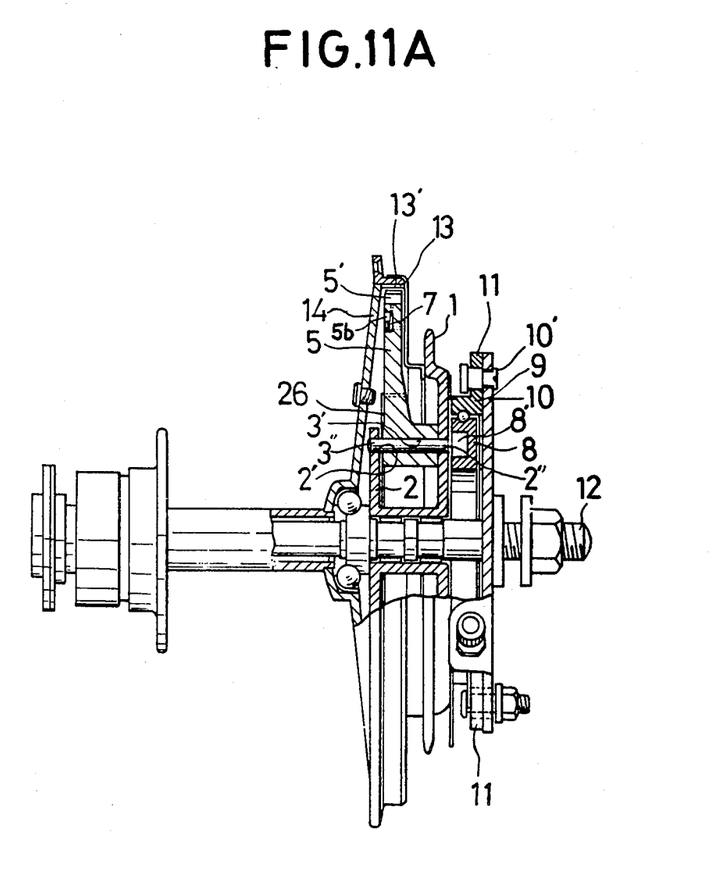
FIG. 11A is an elevational sectional view of another embodiment of the present invention.
Figure 11B:
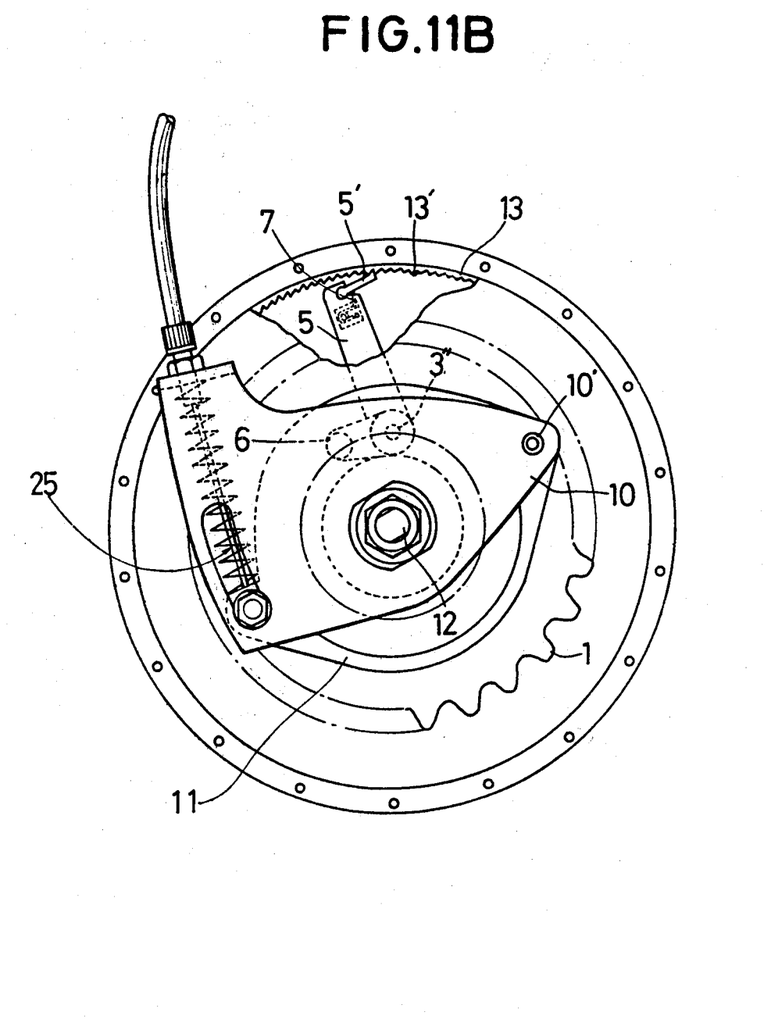
FIG. 11B is a side view of FIG. 11A from the right hand side.
Figure 12:
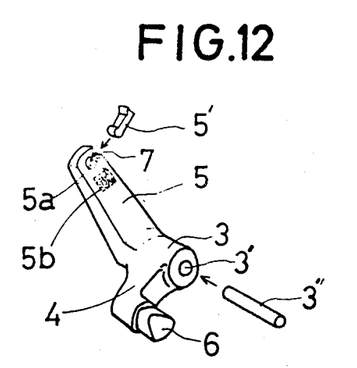
FIG. 12 is an exploded view of a crank unit.
Figure 13:
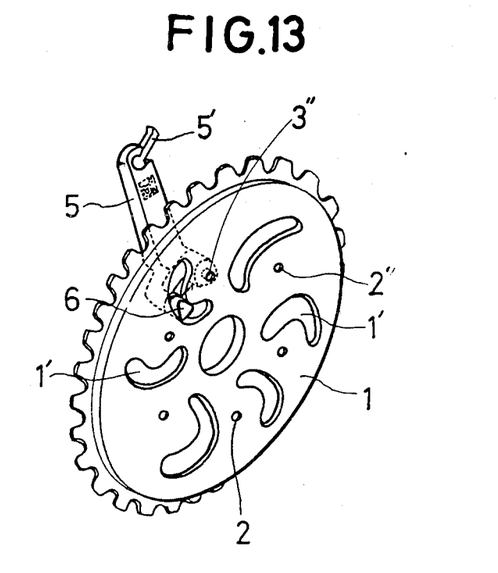
FIG. 13 is a perspective view of a sprocket and a crank unit.

FIGS. 11, 12 and 13 show another embodiment of the present invention. The driving force from pedals (not shown) is transmitted to a sprocket, and boss 2 fixed to the sprocket through a chain 17. The boss 2 has a hollow configuration and has six holes 2', 2'' disposed at positions equally distributed on a coaxial circle.

A rachet arm 5 having a movable claw 5' at its tip is united with a crank arm 4 to constitute a crank unit (FIG. 12), and the base portion of the crank arm 4 constitutes a crank shaft 3 which has a hole 3' for a pin.

In the hole 3' a crank pin 3'' is movably fitted, and both ends of the pin 3'' are mounted in the holes 2' and 2'' respectively. The movable claw 5' has a base portion of circular cross section, which is movably inserted into a hole 5a having a beveling, and the claw 5' is biased in the direction of the arrow by a spring 7 which is inserted in a square recess 5b and one end of which projects into the hole 5a through the wall.

The crank arm 4 has a guide pin 6 at its tip. The guide pin 6 has a triangular section with rounded apexes. The guide pins 6 are slidably fitted in the annular groove 8', which is coaxially provided in an inner race 8, through the arcuate slots 1' which are provided on a sprocket 1 in positions equally distributed on a coaxial circle. A spring 26 is disposed around each crank pin 3" so that the rachet arm is always biased in the direction of the arrow, whereby the guide pin 6 is pushed against the inner wall of the groove 8' so as to prevent the occurrence of too much play caused by abrasion. The inner race 8 is rotatably fitted in the outer race 9 through the balls in the same way as in the aforementioned embodiment.

The operation of the rachet arms of the above described embodiment is identical to that described in relation to FIG. 8. The only different point is that in the former embodiment each rachet arm is oscillated by the crank shaft which extends through the boss of the sprocket 1, while in the latter embodiment each crank shaft is received in the hollow boss and each ratchet arm is capable of oscillating about the crank pin. In the latter embodiment, as each crank shaft is merely supported by the boss, the diameter of the crank shaft can be made large to have enough strength, and also the thickness of the device can be made thin to make the device compact.

Each part of the transmission device of the present invention can be conveniently made of suitable material such as light metals, sintered metal, plastics, etc. Thus light weight and long durability can be attained. Particularly, the precise casting of structural plastics makes machining unnecessary so that sharp cost reduction can be achieved.

As will be readily apparent to those skilled in the art, the present invention may be realized in other specific forms without departing from its spirit or essential characteristics. The present embodiments are, therefore, to be considered as illustrative and not restrictive. For example, instead of combining the cam plate to the inner race at its periphery, they can contact each other through roller bearings etc. Further, a rubber bushing can be provided on the pin 10' for the cam plate so as to absorb the shock caused by speed changes so that smooth speed changing can be attained and the claws will not be damaged.

It will now be apparent that according to this invention a stepless transmission device for a bicycle which has the features of long durability, smooth operation, simple construction and high officiency, and which has been desired in the bicycle industry for a long time can be realized.

What is claimed is:

1. A transmission device for a bicycle which can steplessly change the rotational ratio of a wheel to a drive sprocket by changing the oscillation angle of rachet arms which are radially disposed on the periphery of a disk fixed to a hub shaft for said sprocket, each rachet arm being mounted on one end of a crank shaft with a crank arm mounted at the other end of each said crank shaft, characterized in that said rachet arms incorporated with said respective crank arms are pivotally attached to said sprocket in positions equally distributed on a coaxial circle, and one end of each crank arm supports a guide pin, said guide pin being engaged in an annular groove which is coaxially provided in a rotatable bearing race the eccentricity of which can be changed.

2. A transmission device for a bicycle as claimed in claim 1 wherein a cam plate is provided so as to change the eccentricity of said bearing race in accordance with the tension of a drive chain.

3. A transmission device for a bicycle as claimed in claim 1 or 2 wherein said sprocket is connected with a hub through a planetary gear mechanism.

4. A transmission device for a bicycle as claimed in claim 2 wherein said cam plate is operable with a manual lever through a wire connection therebetween.

* * * * *